United States Patent [19]
Dwivedi et al.

[11] Patent Number: 5,501,263
[45] Date of Patent: Mar. 26, 1996

[54] MACROCOMPOSITE BODIES AND PRODUCTION METHODS

[75] Inventors: Ratnesh K. Dwivedi, Wilmington; Kurt J. Becker, Newark, both of Del.; Danny R. White, Elkton, Md.; Steven D. Keck, Hockessin, Del.; Mark G. Mortenson, North East, Md.

[73] Assignee: Lanxide Technology Company, LP, Newark, Del.

[21] Appl. No.: 976,989

[22] Filed: Jan. 8, 1993

Related U.S. Application Data

[63] Continuation-in-part of Ser. No. 520,924, May 9, 1990, abandoned.

[51] Int. Cl.$^6$ .................................................. B22D 19/14
[52] U.S. Cl. ............................................... 164/97; 164/98
[58] Field of Search ................................ 164/66.1, 69.1, 164/120, 91, 97, 98, 100, 101, 102, 103, 104, 105

[56] References Cited

U.S. PATENT DOCUMENTS

| | | | |
|---|---|---|---|
| 2,951,771 | 9/1960 | Butler | 117/114 |
| 3,031,340 | 4/1962 | Girardot | 117/118 |
| 3,149,409 | 9/1964 | Maruhn | 29/156.5 |
| 3,364,976 | 1/1968 | Reding | 164/63 |

(List continued on next page.)

FOREIGN PATENT DOCUMENTS

| | | |
|---|---|---|
| 0094353 | 11/1983 | European Pat. Off. . |
| 0115742 | 8/1984 | European Pat. Off. . |
| 0340957 | 11/1989 | European Pat. Off. . |
| 0364963 | 4/1990 | European Pat. Off. . |
| 2819076 | 10/1979 | Germany . |
| 144441 | 8/1983 | Japan . |
| 2156718 | 10/1985 | United Kingdom . |

OTHER PUBLICATIONS

F. Delannay, L. Froyen, and A. Deruyttere, "Review: The Wetting of Solids by Molten Metals and Its Relation to the Preparation of Metal–Matrix Composites", Journal of Materials Science, vol. 22, No. 1, pp. 1–16, Jan 1987.

European Search Report for EP 89 63 0179 (Corresponding European Counterpart)**.

A. Mortensen, M. N. Gungor, J. A. Cornie, and M. C. Flemings "Alloy Microstructures in Cast Metal Matrix Composites", Journal of Metals, vol. 38, No. 3, pp. 30–35, Mar. 1986.

G. R. Edwards and D. L. Olson, "The Infiltration Kinetics of Aluminum in Silicon Carbide Compacts", Annual Report from Center for Welding Research, Colorado School of Mines, under ONR Contract No. M00014–85–K–0451, DTIC Report AD–A184 682, Jul. 1987.

*Primary Examiner*—Kuang Y. Lin
*Attorney, Agent, or Firm*—Mark G. Mortenson; Jeffrey R. Ramberg

[57] ABSTRACT

The present invention relates to a novel process for making a macrocomposite body. Specifically, a metal matrix composite body is first formed and thereafter, a ceramic body or a ceramic matrix composite body is caused to form from at least one surface of the already formed metal matrix composite body. The ceramic or ceramic composite body can be formed by, for example, changing from spontaneous infiltration conditions which permit a molten matrix metal to infiltrate a filler material or preform to conditions which favor the growth of a ceramic oxidation reaction product from the matrix metal (e.g., the matrix metal serves the dual role of a matrix metal and a parent metal for growth of oxidation reaction product). The growth of oxidation reaction product can occur from one or more surfaces of a metal matrix composite body and can be controlled to result in any desired shape. Moreover, the oxidation reaction product can be caused to grow directly into an atmosphere to form a ceramic body or can be caused to grow into an adjacently located filler material to form a ceramic matrix composite body. The oxidation reaction product can be formed substantially immediately after the metal matrix composite body is formed or may be formed at any point later in time.

19 Claims, 5 Drawing Sheets

U.S. PATENT DOCUMENTS

| | | | |
|---|---|---|---|
| 3,396,777 | 8/1968 | Reding, Jr. | 164/97 |
| 3,547,180 | 12/1970 | Cochran et al. | 164/61 |
| 3,608,170 | 9/1971 | Larson et al. | 29/149.5 |
| 3,718,441 | 2/1973 | Landingham | 29/182.1 |
| 3,864,154 | 2/1975 | Gazza et al. | 264/60 X |
| 3,868,267 | 2/1975 | Gazza | 264/60 |
| 3,915,699 | 10/1975 | Umehara et al. | 419/17 |
| 3,969,553 | 7/1976 | Kondo et al. | 427/299 |
| 3,970,136 | 7/1976 | Cannell et al. | 164/108 |
| 4,082,864 | 4/1978 | Kendall et al. | 427/248 |
| 4,232,091 | 11/1980 | Grimshaw et al. | 428/472 |
| 4,254,621 | 3/1981 | Nagumo | 164/97 |
| 4,376,803 | 3/1983 | Katzman | 428/408 |
| 4,376,804 | 3/1983 | Katzman | 428/408 |
| 4,404,262 | 9/1983 | Watmough | 428/539.5 |
| 4,450,207 | 5/1984 | Donomoto et al. | 428/614 |
| 4,473,103 | 9/1984 | Kenney et al. | 164/97 |
| 4,482,912 | 11/1984 | Chiba | 428/614 |
| 4,546,048 | 10/1985 | Guenther | 428/614 |
| 4,559,246 | 12/1985 | Jones | 427/299 |
| 4,570,316 | 2/1986 | Sakamaki et al. | 29/156.88 |
| 4,587,177 | 5/1986 | Toaz et al. | 428/614 |
| 4,630,665 | 12/1986 | Novak | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,677,901 | 7/1987 | Ban et al. | 92/213 |
| 4,679,493 | 7/1987 | Munro et al. | 92/212 |
| 4,713,111 | 12/1987 | Cameron et al. | 75/68 R |
| 4,731,298 | 3/1988 | Shindo et al. | 428/611 |
| 4,753,690 | 6/1988 | Wada et al. | 148/11.5 A |
| 4,802,524 | 2/1989 | Donomoto | 164/97 |
| 4,828,008 | 5/1989 | White | 164/66.1 |
| 4,871,008 | 10/1989 | Dwivedi | 164/6 |
| 4,932,099 | 6/1990 | Corwin | 164/97 |
| 4,935,055 | 6/1990 | Aghajanian | 164/107 |
| 5,004,034 | 4/1991 | Park | 164/97 |
| 5,006,417 | 4/1991 | Jackson | 428/614 |
| 5,015,540 | 5/1991 | Borom | 428/614 |
| 5,040,588 | 8/1991 | Newkirk | 164/97 |
| 5,075,175 | 12/1991 | Matsui | 428/614 |
| 5,106,702 | 4/1992 | Walker | 428/614 |

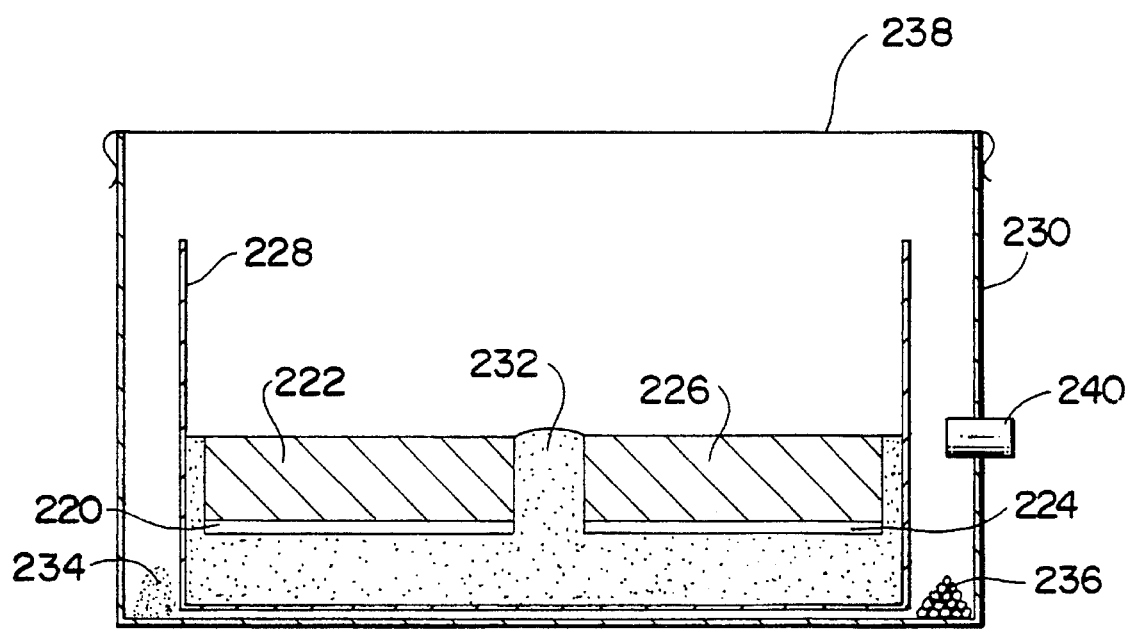
Fig_7

MACROCOMPOSITE BODIES AND PRODUCTION METHODS

This application is a 35 U.S.C. 371 application of PCT/US91/03230, filed May 9, 1991 which is a continuation-in-part of U.S. patent application Ser. No. 07/520,924, filed May 9, 1990, now abandoned.

DESCRIPTION

1. Technical Field

The present invention relates to a novel process for forming macrocomposite bodies by, for example, infiltrating, by any appropriate technique, a permeable mass of filler material or a permeable preform with matrix metal to form a metal matrix composite body and, by an appropriate means, bonding said formed metal matrix composite body to another body. Spontaneous infiltration is one preferred method for forming metal matrix composite bodies. Particularly, an infiltration enhancer and/or an infiltration enhancer precursor and/or an infiltrating atmosphere are in communication with a filler material or a preform, at least at some point during the process, which permits molten matrix metal to spontaneously infiltrate the filler material or preform. Such spontaneous infiltration occurs without the requirement for the application of any pressure or vacuum.

2. Background Art

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, coefficient of thermal expansion (C.T.E.), density, thermal conductivity and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher specific stiffness (e.g., elastic modulus over density), wear resistance, thermal conductivity, low coefficient of thermal expansion (C.T.E.) and high temperature strength and/or specific strength (e.g., strength over density) relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. Still further, the ability to bond metal matrix composites to other bodies has further troubled the art. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer precursor and/or infiltration enhancer is present at least at some point during the process. The spontaneously infiltrated material is capable of being bonded to and/or forming another material, thereby forming a macrocomposite body.

DESCRIPTION OF COMMONLY OWNED U.S. PATENTS AND PATENT APPLICATIONS

This application is a Continuation-in-Part of U.S. patent application Ser. No. 07/520,924, filed May 9, 1990 (and now abandoned), in the names of Ratnesh K. Dwivedi et al., and entitled "Methods For Forming Macrocomposite Bodies By Spontaneous Infiltration and Bodies Produced Therefrom," the subject matter of which is expressly incorporated herein by reference.

The subject matter of this application is related to that of several other copending and co-owned patent applications and issued Patents. Particularly, these other copending patent applications and Patents describe novel methods for making metal matrix composite materials (hereinafter sometimes referred to as "Commonly Owned Metal Matrix Patents and Patent Applications").

A novel method of making a metal matrix composite material is disclosed in Commonly Owned U.S. patent application Ser. No. 07/049,171, filed May 13, 1987, in the names of White et al., and entitled "Metal Matrix Composites", now U.S. Pat. No. 4,828,008, which issued on May 9, 1989, and which published in the EPO on Nov. 17, 1988, as Publication No. 0291441. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. patent application Ser. No. 07/141,642, filed Jan. 7, 1988, in the names of Michael K. Aghajanian et al., and entitled "Method of Making Metal Matrix Composite with the Use of a Barrier," now U.S. Pat. No. 4,935,055, which issued on Jun. 19, 1990, and which published in the EPO on Jul. 12, 1989, as Publication No. 0323945. According to the method of this Aghajanian et al. invention, a barrier means (e.g., particulate titanium diboride or a graphite material such as a flexible graphite foil product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned U.S. patent application Ser. No. 07/994,064, filed Dec. 18, 1992, now U.S. Pat. No. 5,298,339, which issued on Mar. 29, 1994, which is a continuation of U.S. patent application Ser. No. 07/759,745, filed Sep. 12, 1991 (and now abandoned), which was a continuation of U.S. patent application Ser. No. 07/517,541, filed Apr. 24, 1990, which was a continuation of U.S. patent application Ser. No. 07/168,284, filed Mar. 15, 1988 (now abandoned), in the names of Michael K. Aghajanian and Marc S. Newkirk and entitled "Metal Matrix Composites and Techniques for Making the Same", and which published in the EPO on Sep. 20, 1989, as Publication No. 0333629. In accordance with the methods disclosed in this U.S. Patent, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned U.S. patent application Ser. No. 07/863,894, filed Apr. 6, 1992, now U.S. Pat. No. 5,249,621, which issued on Oct. 5, 1993, which is a continuation of U.S. patent application Ser. No. 07/521,043, filed May 9, 1990 (and now abandoned), which was a continuation-in-part application of U.S. patent application Ser. No. 07/484,753, filed Feb. 23, 1990 (and now abandoned), which was a continuation-in-part application of U.S. patent application Ser. No. 07/432,611, filed Nov. 7, 1989 (now abandoned), which was a continuation-in-part application of U.S. patent application Ser. No. 07/416,327, filed Oct. 6, 1989 (now abandoned), which was a continuation-in-part application of U.S. patent application Ser. No. 07/349,590, filed May 9, 1989 (now abandoned), which in turn was a continuation-in-part application of U.S. patent application Ser. No. 07/269,311, filed Nov. 10, 1988 (now abandoned), all of which were filed in the names of Aghajanian et al. and all of which are entitled "A Method of Forming Metal Matrix Composite Bodies By A Spontaneous Infiltration Process, and Products Produced Therefrom" (an EPO application corresponding to U.S. patent application Ser. No. 07/416,327 was published in the EPO on Jun. 27, 1990, as Publication No. 0375588). According to this Aghajanian et al. patent, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system. However, it is clear from the disclosure set forth in the Aghajanian et al. applications that the spontaneous infiltration behavior should occur in other matrix metal/infiltration enhancer precursor/infiltrating atmosphere systems.

Further improvements in metal matrix technology is disclosed in commonly owned U.S. patent application Ser. No. 07/269,464, filed Nov. 10, 1988, in the names of Marc S. Newkirk et al., and entitled "Methods for Forming Macrocomposite Bodies and Macrocomposite Bodies Produced Thereby," now U.S. Pat. No. 5,040,588, which issued on Aug. 20, 1991, and which published in the EPO on May 23, 1990, as Publication No. 0369931. According to this Newkirk et al., patent, complex composite bodies (i.e., bodies which comprise a metal matrix composite body and a second body) are formed, for example, by first forming a metal matrix composite body which can be contacted with and bonded to a second body. Alternatively, formation of a metal matrix composite body and bonding to a second body can occur substantially simultaneously. Numerous combinations of metal matrix composite bodies and single second bodies or multiple second bodies are disclosed.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

Moreover, some co-owned and issued patents and some copending and co-owned patent applications describe novel methods for reliably producing ceramic matrix materials and ceramic matrix composite materials (hereinafter sometimes referred to as "Commonly Owned Ceramic Matrix Patents and Patent Applications"). The technology for forming ceramic matrix and ceramic matrix composite bodies may be used in combination with the formation of metal matrix composite bodies.

A method for producing ceramic materials is disclosed generically in Commonly Owned U.S. Pat. No. 4,713,360, which was issued on Dec. 15, 1987, in the names of Marc S. Newkirk et al and entitled "Novel Ceramic Materials and Methods for Making Same" (a foreign counterpart to this patent was published in the EPO on Sep. 25, 1985, as Publication No. 0,155,831). This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant, thereby continuously developing a ceramic polycrystalline body which can, if desired, include an interconnected metallic component. The process may be enhanced or in certain cases enabled by the use of one or more dopants alloyed with the parent metal. For example, in the case of oxidizing aluminum in air, it is desirable to alloy magnesium and silicon with the aluminum to produce alpha-alumina ceramic structures.

The method of U.S. Pat. No. 4,713,360 was improved upon by the application of dopant materials to the surface of the parent metal, as described in Commonly Owned U.S. Pat. No. 4,853,352, which issued on Aug. 1, 1989, in the names of Marc S. Newkirk et al and entitled "Methods of making Self-Supporting Ceramic Materials" (a foreign counterpart to this Application was published in the EPO on Jan. 22, 1986, as Publication No. 0,169,067).

A similar oxidation phenomenon was utilized in producing ceramic composite bodies as described in Commonly Owned U.S. Pat. No. 4,851,375, which issued on Jul. 25, 1989, in the names of Marc S. Newkirk et al and entitled "Composite Ceramic Articles and Methods of Making Same" (a foreign counterpart to this Application was published in the EPO on Sep. 3, 1986, as Publication No. 0,193,292). This Patent discloses novel methods for producing a self-supporting ceramic composite body by growing an oxidation reaction product from a parent metal precursor into a permeable mass of filler, thereby infiltrating or embedding the filler with a ceramic matrix. The resulting composite, however, has no defined or predetermined geometry, shape, or configuration.

A method for producing ceramic composite bodies having a predetermined geometry or shape is disclosed in Commonly Owned U.S. patent application Ser. No. 861,025, filed May 8, 1986, in the names of Marc S. Newkirk et al and entitled "Shaped Ceramic Composites and Methods of Making the Same", which issued on May 21, 1991, as U.S. Pat. No. 5,017,526, entitled "Method of Making Shaped Ceramic Composite" (a foreign counterpart to this Application was published in the EPO on Nov. 11, 1987, as Publication No. 0,245,192). In accordance with the method in this U.S. Patent, the developing oxidation reaction product infiltrates a permeable self-supporting preform of filler material (e.g., an alumina or a silicon carbide preform material) in a direction towards a defined surface boundary to result in predetermined geometric or shaped composite bodies.

It was discovered that high shape fidelity is more readily achieved by providing the preform with a barrier means, as disclosed in Commonly Owned U.S. patent application Ser. No. 295,488, filed Jan. 10, 1989, which is a continuation of U.S. patent application Ser. No. 861,024, filed May 8, 1986, now U.S. Pat. No. 4,923,832, which issued on May 8, 1990, all in the names of Marc S. Newkirk et al. This method produces shaped self-supporting ceramic bodies, including shaped ceramic composites, by growing the oxidation reaction product of a parent metal to a barrier means spaced from the metal for establishing a boundary or surface. Above-mentioned U.S. application Ser. No. 861,024 corresponds to European Patent Application No. 87630076.5, which was published on Nov. 11, 1987, as European Patent Application Publication No. 0245193.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum and the created growth alloy is utilized as the parent metal. The resulting oxidation reaction product of such a growth alloy comprises alumina, typically alpha-alumina.

Novel ceramic composite structures and methods of making the same are also disclosed and claimed in certain of the aforesaid Commonly Owned Ceramic Matrix Patent Applications which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Each of the above-discussed Commonly Owned Ceramic Matrix Patents and Patent Applications describes methods for the production of ceramic matrix and ceramic matrix composite bodies. However, in the interest of brevity, a further discussion of the formation of ceramic and ceramic composite bodies by the aforementioned patents and patent applications shall not be included herein. The entire disclosures of all the foregoing Commonly Owned Ceramic Matrix Patents and Patent Applications are expressly incorporated herein by reference.

SUMMARY OF THE INVENTION

A macrocomposite body is produced by spontaneously infiltrating a permeable mass of filler material or a preform with a molten matrix metal to form a metal matrix composite body and causing the metal matrix composite body to bond to another or second body. Specifically, in regard to the formation of a metal matrix composite body, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

In a first preferred embodiment, a matrix metal is selected so as to function as both a matrix metal and a parent metal. Specifically, a metal matrix composite body is first formed and thereafter, a ceramic matrix composite body is formed from at least one surface of the already formed metal matrix composite body. The ceramic matrix composite body can be formed by, for example, changing from spontaneous infiltration conditions which permit the molten matrix metal to infiltrate a filler material or preform to conditions which favor the growth of an oxidation reaction product from the matrix metal (e.g., the matrix metal serves the dual role of a matrix metal and a parent metal for growth of oxidation reaction product). Thus, by first forming a metal matrix composite body and thereafter subjecting the formed metal matrix composite body to an environment which favors growth of oxidation reaction product from at least one surface of the formed metal matrix composite body. The growth of oxidation reaction product can occur from one or more surfaces of a metal matrix composite body and can be controlled to result in any desired shape. Moreover, the oxidation reaction product can grow directly into an atmosphere or can be caused to grow into an adjacently located filler material. The oxidation reaction product can be formed substantially immediately after the metal matrix composite body is formed or may be formed at any point later in time.

Moreover, it should be understood that even though significant emphasis is placed upon the formation of metal matrix composites by a spontaneous infiltration technique, any technique for forming metal matrix composite bodies can be used in conjunction with the concept of a metal undertaking the dual role of a matrix metal and a parent metal. Accordingly, so long as a metal can serve as a matrix in a metal matrix composite body and have a composition which permits the formation of oxidation reaction product, the present invention can be achieved. Thus, metal matrix composite formation techniques such as pressure infiltration, vacuum infiltration, casting, powder metallurgy, etc., are all combinable with the teachings included herein.

In another preferred embodiment, conditions can be created within a non-homogeneous mass of filler material or a preform wherein a portion of a non-homogeneous mass favors spontaneous infiltration of a molten matrix metal to occur, and wherein another portion of the mass does not permit spontaneous infiltration to occur. In the portion of the mass which did not permit spontaneous infiltration to occur, the growth of oxidation reaction product can be induced. Specifically, similar to the first embodiment discussed above, an oxidation reaction product can be grown from at least one surface of a formed metal matrix composite body thereby forming a ceramic matrix composite body surface on the metal matrix composite body substrate.

In still another preferred embodiment of the invention, a metal matrix composite surface can be formed on at least one surface of a matrix metal body. Specifically, a matrix metal can be provided with a relatively thin, or relatively thick, coating of an appropriate filler material which is conducive to the formation of metal matrix composite. The metal substrate can thereafter be exposed to appropriate processing conditions to permit spontaneous infiltration to occur, thereby resulting in the filler material covering the substrate metal to be spontaneously infiltrated to a desired extent. The result is a formation of an MMC surface on a matrix metal substrate.

In each of the above-discussed preferred embodiments for forming a metal matrix composite, a precursor to an infiltration enhancer may be supplied to at least one of, a filler material or preform, and/or a matrix metal and/or an infiltrating atmosphere. The supplied infiltration enhancer precursor may thereafter react with at least one of the filler material or preform and/or the matrix metal and/or the infiltrating atmosphere to produce infiltration enhancer in at least a portion of, or on, the filler material or preform. Ultimately, at least during the spontaneous infiltration, infiltration enhancer should be in contact with at least a portion of the filler material or preform.

Alternatively, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be in contact with at least a portion of the filler material or preform.

This application discusses various examples of matrix metals, which at some point during the formation of a metal matrix composite, are contacted with an infiltration enhancer precursor, in the presence of an infiltrating atmosphere. Thus, various references will be made to particular matrix metal/infiltration enhancer precursor/infiltrating atmosphere systems which exhibit spontaneous infiltration. However, it is conceivable that many other matrix metal/infiltration enhancer precursor/infiltrating atmosphere systems other than those discussed in this application may behave in a manner similar to the systems discuss above herein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though this application discusses only those systems referred to above herein (with particular emphasis being placed upon the aluminum/magnesium/nitrogen system), it should be understood that other matrix metal/infiltration enhancer precursor/infiltrating atmosphere systems may behave in a similar manner.

In a preferred embodiment for achieving spontaneous infiltration into a permeable mass of filler material or a preform, molten matrix metal is contacted with the preform or filler material. The preform or filler material may have admixed therewith, and/or at some point during the process, be exposed to, an infiltration enhancer precursor. Moreover, in a preferred embodiment, the molten matrix metal and/or preform or filler material communicate with an infiltrating atmosphere for at least a portion of the process. In another preferred embodiment, the matrix metal and/or preform or filler material communicate with an infiltrating atmosphere for substantially all of the process. The preform or filler material will be spontaneously infiltrated by molten matrix metal, and the extent or rate of spontaneous infiltration and formation of metal matrix composite will vary with a given set of processing conditions including, for example, the concentration of infiltration enhancer precursor provided to the system (e.g., in the molten matrix alloy and/or in the filler material or preform and/or in the infiltrating atmosphere), the size and/or composition of the filler material, the size and/or composition of particles in the preform, the available porosity for infiltration into the preform or filler material, the time permitted for infiltration to occur, and/or the temperature at which infiltration occurs. Spontaneous infiltration typically occurs to an extent sufficient to embed substantially completely the preform or filler material.

Moreover, by varying the composition of the matrix metal and/or the processing conditions, the physical and mechanical properties of the formed metal matrix composite bodies may be engineered to any particular application or need. Further, by subjecting a formed metal matrix composite body to a post treatment process (e.g., directional solidification, heat treatment, etc.) the mechanical and/or physical properties may be further engineered to meet any particular application or need. Still further, by controlling the processing conditions during the formation of a metal matrix composite the nitrogen content of the formed metal matrix composite may be tailored to meet a wide range of industrial applications.

Moreover, by controlling the composition and/or size (e.g., particle diameter) and/or geometry of the filler material or the material comprising the preform, the physical and/or mechanical properties of the formed metal matrix composite can be controlled or engineered to meet any number of industrial needs. For example, it has been discovered that wear resistance of the metal matrix composite can be increased by increasing the size of the filler material (e.g., increasing the average diameter of the filler material particles), given that the wear resistance of filler material is higher than that of the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler material, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite portion of a macrocomposite body can be engineered to contain a desired combination of properties.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal, etc.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Filler", as used herein, is intended to include either single constituents or mixtures of constituents which are substantially non-reactive with and/or of limited solubility in the matrix metal and may be single or multi-phase. Fillers may be provided in a wide variety of forms and sizes, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Growth Alloy", as used herein, in conjunction with ceramic or ceramic composite bodies means any alloy containing initially or at some point during processing obtaining a sufficient amount of requisite constituents to result in growth of oxidation reaction product therefrom.

"Hot-Topping", as used herein, refers to the placement of a substance on one end (the "topping" end) of an at least partially formed metal matrix composite which reacts exothermically with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal.

"Infiltration Enhancer", as used herein, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal.

"Infiltration Enhancer Precursor" or "Precursor to the Infiltration Enhancer", as used herein, means a material which when used in combination with (1) the matrix metal, (2) preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite body (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal" means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material or preform in a manner which would be significantly detrimental to the spontaneous infiltration mechanism. The nonreactive vessel may be disposable and removable after the spontaneous infiltration of the molten matrix metal has been completed.

"Oxidation Reaction Product", as used herein in conjunction with ceramic matrix composite bodies, means one or more metals in any oxidized state wherein the metal(s) has given up electrons to or shared electrons with another element, compound, or combination thereof. Accordingly, an "oxidation reaction product" under this definition includes the product of reaction of one or more metals with one or more oxidants.

"Parent Metal", as used herein in conjunction with ceramic matrix composite bodies, means that metal(s) (e.g., aluminum, silicon, titanium, tin and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein:

FIG. 7 is a schematic cross-sectional view of a lay-up used to form a body in accordance with Example 2;

DETAILED DESCRIPTION OF THE INVENTION AND PREFERRED EMBODIMENTS

The present invention relates to forming a metal matrix composite by spontaneously infiltrating a filler material or preform with molten matrix metal. The formed metal matrix composite is caused to be integral with (i.e., bonded to) another body. Particularly, to form the metal matrix composite body, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

Figure 1A:
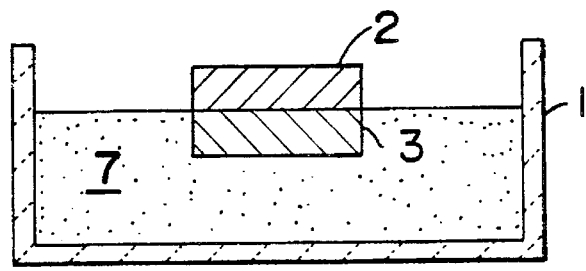
FIG. 1a shows an interrupted infiltration in schematic cross-sectional view.
Figure 1B:
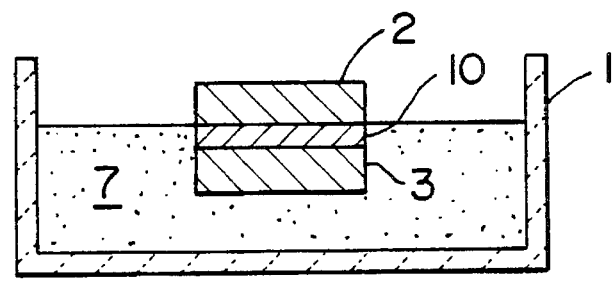
FIG. 1 is a schematic cross-sectional view of a lay-up used to produce a metal matrix composite body.

FIGS. 1A and 1B show a first embodiment of the invention. Specifically, a refractory vessel 1 contains therein a non-infiltratable material 7 as a bedding within which a preform 3 is located. A matrix metal 2, which also later functions as a parent metal, is placed into contact with the preform 3. Conditions are created which permit the spontaneous infiltration of matrix metal 2 into the preform 3. However, the process conditions favorable for spontaneous infiltration are altered so as to create conditions favorable for the growth of oxidation reaction product into a remaining portion of the preform 3. The growth of oxidation reaction product occurs in accordance with the teachings of the aforementioned Commonly Owned Ceramic Matrix Patents and Patent Applications. The process conditions which can be altered to create favorable growth conditions include, for example, (1) providing a non-homogeneous composition in the preform 3 which does not permit spontaneous infiltration thereinto, but which permits growth of oxidation reaction product; (2) changing the temperature from an infiltrating temperature to a growth temperature; and/or (3) changing the atmosphere from one which is conducive to infiltration to one which is conducive to growth of oxidation reaction product. Accordingly, the resultant macrocomposite body will comprise a metal matrix composite corresponding to the infiltrated portion 10 shown in FIG. 1B which is integrally bonded to a ceramic matrix composite corresponding to the uninfiltrated portion of the preform 3 shown in FIG. 1B.

Figure 2:
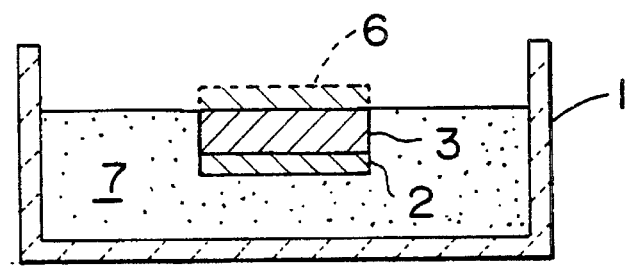
FIG. 2 is a schematic cross-sectional view of a lay-up for forming a ceramic surface on a metal matrix composite substrate.

FIG. 2 shows another preferred embodiment of the invention. In this embodiment, a matrix metal 2, which also later functions as a parent metal, is contacted with a bottom portion of a preform 3. Processing conditions are created which render favorable the spontaneous infiltration of molten matrix metal 2 into the preform 3. Processing conditions can thereafter be altered to create conditions favorable for the growth of a ceramic matrix 6 from the surface of the substantially completely infiltrated preform 3. The growth of oxidation reaction product occurs in accordance with the teachings of the aforementioned Commonly Owned Ceramic Matrix Patents and Patent Applications. The processing conditions which can be altered to permit growth of oxidation reaction product from a surface of the infiltrated preform 3, as discussed above, could involve the change of temperature, the change of atmosphere, etc. The result of the embodiment shown in FIG. 2 is a metal matrix composite body integrally bonded to a ceramic body, said ceramic body comprising the oxidation reaction product of the matrix/parent metal 2.

Figure 3:
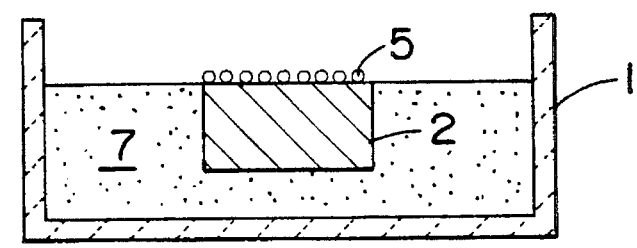
FIG. 3 is a schematic cross-sectional view of a lay-up used to form a metal matrix composite surface on a metal substrate.

In a third preferred embodiment of the invention, a metal matrix composite surface is induced to form on at least one surface of a matrix metal body. Specifically, in reference to FIG. 3, a matrix metal 2 is contacted with a filler material or preform 5. The thickness of the filler material 5 can be any thickness desired. Specifically, the thickness of the filler material 5 could be as thin as a few microns to as thick as a few inches. Favorable spontaneous infiltration conditions are then created so as to cause molten matrix metal 2 to infiltrate the filler material 5. The result of this embodiment is the formation of metal matrix composite surface layer on a matrix metal substrate.

Figure 4:
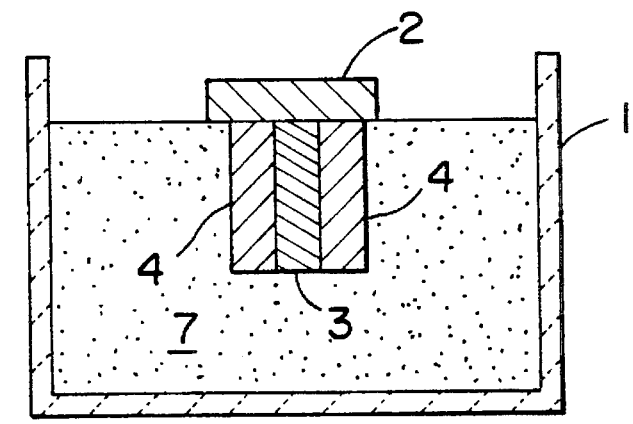
FIG. 4 is a schematic cross-sectional view of a lay-up used to produce a ceramic matrix composite surface on a metal matrix composite substrate.

In another preferred embodiment of the invention, a ceramic matrix composite surface is caused to form on a metal matrix composite substrate. Particularly, with reference to FIG. 4, a preform 3 is contacted with a preform 4 (or an assemblage of preforms 4). A matrix metal 2 is caused to spontaneously infiltrate the preform 3 by subjecting the lay-up to conditions which permit spontaneous infiltration to occur. The preform 3 is substantially completely infiltrated by molten matrix metal 2. However, the preform(s) 4 are not infiltrated by molten matrix metal because, for example, the conditions within the preform 4 are not favorable to such infiltration (e.g., the filler material comprising the preform 4 does not permit spontaneous infiltration to occur because of composition, size, etc.). However, so long as molten matrix metal is provided to at least a portion of the surface of each of the preform(s) 4 and conditions are created which render the formation of oxidation reaction product favorable, oxidation reaction product can be induced to grow from a surface of the formed metal matrix composite body and into the preform(s) 4. The growth of oxidation reaction product occurs in accordance with the teachings of the aforementioned Commonly Owned Ceramic Matrix Patents and Patent Applications. The result of this embodiment is a ceramic matrix composite surface on a metal matrix composite substrate. It should be understood that the ceramic matrix composite surface could substantially completely surround the formed metal matrix composite body or surround only a portion of the formed metal matrix composite.

With regard to the formation of a matrix metal composite body, and without wishing to be bound by any particular theory or explanation, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer precursor could volatilize from the molten matrix metal and react with at least one of the filler material or preform and/or the infiltrating atmosphere. Such reaction could result in the formation of an infiltration enhancer which may be a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react with the solid species (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer precursor, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/magnesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, which issued on Jul. 25, 1989, entitled "Methods of Making Composite Ceramic Articles Having Embedded Filler", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patent Application.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with closed cell porosity or into a fully dense structure that would prevent infiltration by the molten alloy. Specifically, volume fractions on the order of about 60 to 80 volume percent can be achieved by methods such as vibrational packing, controlling particle size distribution, etc. However, alternative techniques can be utilized to achieve even higher volume fractions of filler. Volume fractions of filler on the order of 40 to 50 percent are preferred for thermo-forming in accordance with the present invention. At such volume fractions, the infiltrated composite maintains or substantially maintains its shape, thereby facilitating secondary processing. Higher or lower particle loadings or volume fractions could be used, however, depending on the desired final composite loading after thermo-forming. Moreover, methods for reducing particle loadings can be employed in connection with the thermo-forming processes of the present invention to achieve lower particle loadings.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Further, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18–20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark Grafoil®, registered to Union Carbide. This graphite foil exhibits sealing characteristics that prevent the migration of molten aluminum alloy beyond the defined surface boundary of the filler material. This graphite foil is also resistant to heat and is chemically inert. Grafoil® graphite foil is flexible, compatible, conformable and resilient. It can be made into a variety of shapes to fit any barrier application. However, graphite barrier means may be employed as a slurry or paste or even as a paint film around and on the boundary of the filler material or preform. Grafoil® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

If a metal matrix composite body is first formed, an infinite number of permutations of growing a oxidation reaction product from at least a portion of a surface of the formed metal matrix composite body is possible. Only a few exemplary embodiments of combining a ceramic matrix composite body and metal matrix composite body have been discussed above herein. However, these limited embodiments should not be construed as limiting the scope of the invention as defined in the appended claims. Moreover, a barrier means, as disclosed in commonly owned U.S. Pat. No. 4,923,832, which issued on May 8, 1990 (and as discussed above), can be used in combination with the formation of an oxidation reaction product so as to achieve any desirable exterior shape of the oxidation reaction product.

Moreover, if it is desired to form a metal matrix composite surface on the matrix metal, the metal matrix composite surface could be formed in an infinite number of combinations. Specifically, the metal matrix composite surface could be formed on only a portion of the matrix metal or on substantially all of the matrix metal. Additionally, the use of a barrier means can permit any shaped formation of metal matrix composite from a surface of the matrix metal.

Various demonstrations of the present invention are included in the Examples immediately following. However, these Examples should be considered as being illustrative and should not be construed as limiting the scope of the invention as defined in the appended claims.

EXAMPLE 1

This Example demonstrates the formation of a macrocomposite body comprising a metal matrix composite substrate and a ceramic matrix composite coating formed thereon. The metal matrix composite substrate is formed by the spontaneous infiltration of a molten matrix metal into a permeable mass of a filler material and the ceramic matrix composite is formed by the directed oxidation of a molten matrix metal (which serves the dual role of a parent metal as well) into a permeable mass of a filler material.

Figure 5:
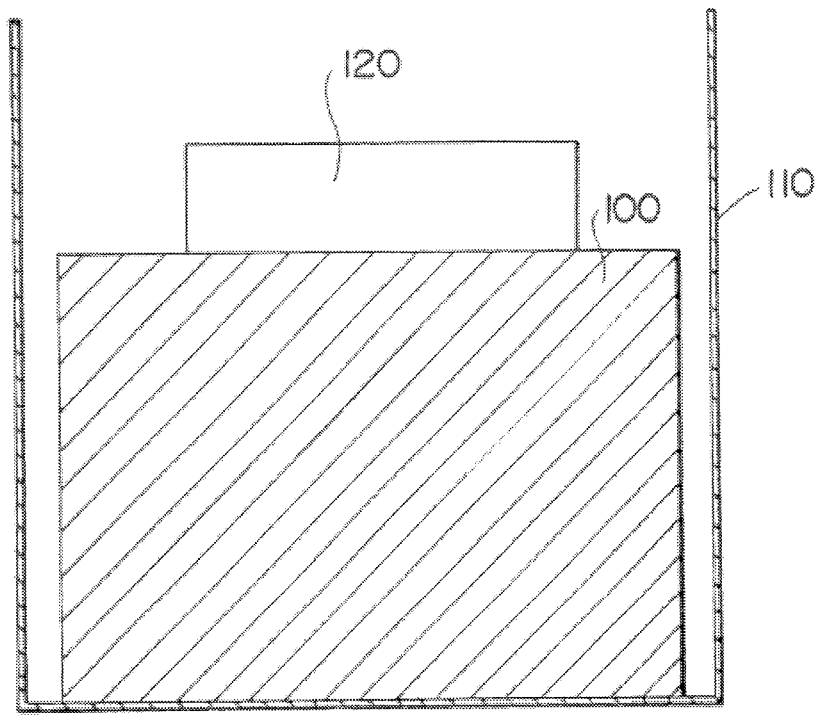
FIG. 5 is a schematic cross-sectional view of a lay-up used to make a metal matrix composite body in accordance with Example 1.

Specifically, the ceramic matrix composite substrate is formed from and bonded to at least one surface of the formed metal matrix composite by contacting at least one surface of the metal matrix composite substrate with a permeable mass of filler material and using the matrix metal (hereinafter referred to as "parent metal" in conjunction with the formation of oxidation reaction product) within the metal matrix composite as the source of parent metal for growth of the oxidation reaction product. The oxidation reaction product is grown by oxidizing said parent metal with an oxidant and directing the growth of oxidation reaction product of the parent metal and the oxidant through the permeable mass of filler material juxtaposed to the formed metal matrix composite body and substantially completely embedding said permeable mass of filler material to produce a ceramic matrix composite coating on, and intimately bonded to, the metal matrix composite substrate. FIG. 5 shows a cross-sectional schematic view of the lay-up employed in fabricating the metal matrix composite substrate and FIG. 1A shows a cross-sectional schematic view of a lay-up which is similar to the actual lay-up employed in fabricating the ceramic matrix composite layer on a surface of the formed metal matrix composite substrate.

A metal matrix composite substrate was first formed by the following procedure. A quantity of 39 CRYSTOLON® silicon carbide particulate (Norton Company, Worcester, Mass.) having an average particle size of about 17 microns was loaded into a refractory boat measuring about 14 inches (356 mm) by about 11 inches (279 mm) by about 6 inches (152 mm) which was lined with FIBERFRAX® ceramic fiber paper (Carborundum Company, Niagara Falls, N.Y.). After loading the ceramic fiber paper-lined refractory boat with the silicon carbide particulate to a depth of about 3 inches (75 mm), the boat and its contents were placed into an air atmosphere resistance heated furnace and heated to a temperature of about 1325° C. at a rate of about 87° C. per hour. After maintaining a temperature of about 1325° C. for about 24 hours, power to the heating elements over the furnace was interrupted, and the furnace and its contents were allowed to cool to about room temperature. During the heating process, part of the silicon carbide, specifically, at least a portion of the exterior of the particles, oxidized to form silica ($SiO_2$). The silica content of the oxidized silicon carbide powder comprised about 14 percent of the total weight of the powder. The partially oxidized silicon carbide particulate was then comminuted first by jaw crushing and then by sieving the jaw crushed agglomerates until the agglomerates were broken down to approximately minus 200 mesh (i.e., substantially all particles were smaller than about 75 microns), at which point the powder was ready for sediment casting.

A slurry comprising by weight about 23.5 percent distilled water, about 0.5 percent ELMER'S® glue (Borden Company, Columbus, Ohio) and the balance the aforementioned partially oxidized silicon carbide particulate was prepared as follows. The distilled water and glue components were placed into a beaker and stirred for about 15 minutes using a Type RZR 50 Crafamo laboratory mixer (Crafamo Company, Wiarton, Ontario, Canada). About 41 grams of the silicon carbide particulate was placed into an approximately 500 ml plastic jar along with about 12 approximately 0.5 inch (13 mm) diameter by about 0.5 inch (13 mm) high BURUNDUM® cylindrical ball milling stones (U.S. Stoneware Corporation, Mahwah, N.J.). The stirred water/glue solution was then added to the plastic jar, the jar was sealed, and the slurry of silicon carbide particulate and liquid was roll-mixed for about 2 hours by placing the sealed plastic jar on a rotating mill rack. After roll mixing the silicon carbide slurry, the plastic jar was removed from the mill rack, opened, and placed into a vacuum chamber to deair the slurry. Specifically, the vacuum chamber was evacuated to at least about 25 inches (635 mm) of mercury vacuum and maintained at this reduced pressure for about 1 minute. The vacuum chamber was then permitted to return to atmospheric pressure, and the plastic jar and its contents were removed from the vacuum chamber.

A Grade GI-1000 silicone rubber mold (Plastic Tooling Supply Company, Exton, Pa.) having an internal cavity measuring about 2 inches (51 mm) square by about ½ inch (13 mm) deep was placed onto a rigid aluminum plate for support which was situated on top of a vibration table. The desired silicon slurry was then poured into the cavity in the silicone rubber mold and vibration was commenced to assist in settling solids from the slurry. After about 0.5 hour, the excess water on the surface of the developing sediment cast preform was removed with a paper towel. After vibrating for an additional 1 to 1.5 hours, the remaining surface water was removed with a paper towel, and the aluminum plate containing the silicone rubber mold and the sediment cast preform was removed from the vibration table and placed into a freezer at a temperature of about −12° C. After about 6 hours in the freezer, the residual water in the preform had frozen sufficiently, and the silicone rubber mold containing the preform within was removed from the freezer and the frozen sediment cast preform was removed from the silicone rubber mold. The preform was then placed on a bed of 38 ALUNDUM® alumina particulate material (Norton Company) having an average particle size of about 216 microns and allowed to dry in air at about room temperature for about 16 hours. The dried sediment cast preform measured about 2 inches (51 mm) square by about 0.35 inch (8.9 mm) thick and weighed about 41.3 grams.

The dried sediment cast preform was then placed on top of a slotted fire brick and loaded into a resistance heated air atmosphere furnace. The furnace was then heated from about room temperature to a temperature of about 1200° C. at a rate of about 234° C. per hour. After maintaining a temperature of about 1200° C. for about 10 hours, the furnace temperature was then decreased to about room temperature at a rate of about 234° C. per hour. The weight of the preform following this firing treatment was about 41.6 grams. The dimensions of the preform in the as-fired condition were about 52 mm in length by about 51 mm in width by about 9 mm in thickness.

Referring to FIG. 5, an ingot of matrix metal 100 measuring nominally 4 inches (102 mm) square and weighing about 1800 grams and comprising by weight about 7.5–9.5 percent silicon, $\leq 1.0\%$ iron, about 3.0–4.0% copper, $\leq 0.5$–0% manganese, about 5% magnesium, $\leq 0.5$–0% nickel, about 2.9% zinc, $\leq 0.35\%$ tin, and the balance aluminum was placed on the bottom of a steel can 110 measuring about 4.25 inches (108 mm) square by about 2 inches (51 mm) high. The fired preform 120 was then placed into the steel can 110 and centered on top of the ingot of matrix metal 100 to complete the lay-up.

The lay-up comprising the steel can 110 and its contents was then placed into the chamber of a retort. The retort chamber was sealed to the external atmosphere and the retort chamber was evacuated to a final working pressure of about $2 \times 10^{-4}$ torr. After maintaining a reduced pressure in the $2 \times 10^{-4}$ torr to about $3.6 \times 10^{-4}$ torr range for about ½ hour, the retort was backfilled with commercially pure nitrogen gas to about atmospheric pressure. A nitrogen gas flow rate through the retort chamber of about 2 liters per minute was thereafter established. The retort was then heated from about room temperature to a temperature of about 800° C. at a rate of about 155° C. per hour. After maintaining a temperature of about 800° C. for about 20 hours, the temperature was then decreased back to about room temperature at a rate of about 155° C. per hour.

After the retort had cooled to about room temperature, the lay-up was removed from the retort chamber revealing that the matrix metal 100 had substantially infiltrated the preform 120 to produce a metal matrix composite body comprising silicon carbide particulate embedded by the matrix metal.

The formed metal matrix composite body was then removed from the residual solidified mass of matrix metal, and a mass weighing approximately 1.3 grams of the formed metal matrix composite body was placed onto the surface of an approximately 1 inch (25 mm) thick bedding of partially oxidized 39 CRYSTOLON® silicon carbide particulate (Norton Company) having an average particle size of about 17 μm, contained within a clay crucible whose interior measured about 1 inch (25 mm) in diameter by about 2 inches (51 mm) deep. The silica content of the partially oxidized particulate bedding amounted to about 14 percent of the total weight of the particulate bedding material. An ingot of a metal weighing about 1.46 grams and comprising by weight about 7.5–9.5% silicon, $\leq 1.0\%$ iron, about 3.0–4.0% copper, $\leq 0.5$–0% manganese, about 0.2–0.3% magnesium, $\leq$ about 0.5–0% nickel, about 2.9% zinc, $\leq$ about 0.35% tin and the balance aluminum was centered on top of the metal matrix composite body. Additional comminuted particulate bedding material was placed around the sides of the exposed metal matrix composite body and the metal ingot until only the top surface of the ingot was left exposed to complete the lay-up.

The lay-up comprising the clay crucible and its contents was then placed into a resistance heated air atmosphere furnace. The furnace was then heated from about room temperature to a temperature of about 900° C. at a rate of about 174° C. per hour. After maintaining the temperature of about 900° C. for about 4 hours, power to the heating elements of the furnace was interrupted, and the furnace and its contents were allowed to cool.

Figure 6:
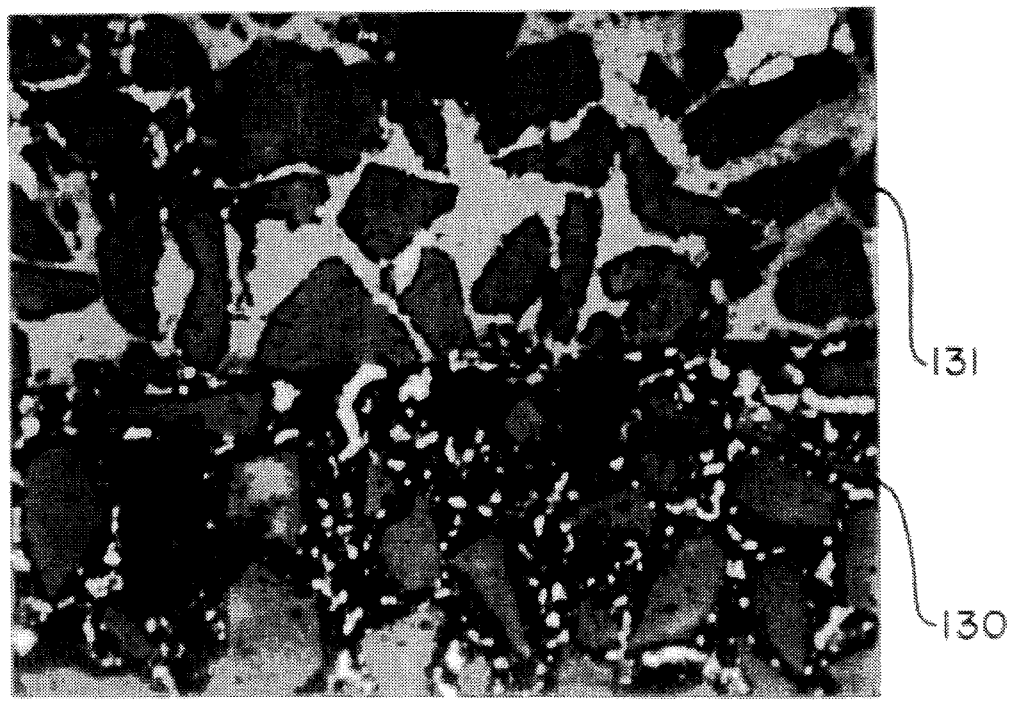
FIG. 6 is an optical photomicrograph taken at about 1000X magnification of a macrocomposite body formed according to Example 1.

After cooling to about room temperature, the lay-up was recovered from the furnace to reveal the presence of a second composite material surrounding the residual mass of metal ingot and the formed metal matrix composite body. Microscopic examination of the second composite material showed that the material comprised the silicon carbide particulate bedding material embedded by an alumina oxidation reaction product as well as some residual unreacted parent metal. FIG. 6 is an approximately 1000X magnification optical photomicrograph of the boundary between the metal matrix composite substrate 131 and the ceramic matrix composite body 130 and shows intimate bonding between the two composites.

This Example, therefore, demonstrates that a ceramic matrix composite comprising an oxidation reaction product of a parent metal (which also functions as a matrix metal) with an oxidant can be formed on or adjacent to a surface of a metal matrix composite body. Still further, a back side of the metal matrix composite substrate may be contacted with an ingot of matrix metal to replenish that matrix metal within the metal matrix composite body which was used as a source of parent metal in forming the adjoining ceramic matrix composite body, thus ameliorating the sometimes undesirable porosity within the metal matrix composite body due to local depletion of the matrix metal within said metal matrix composite body.

EXAMPLE 2

This Example demonstrates that a metal matrix composite coating can be formed on the surface of a matrix metal to produce a macrocomposite body. The setup used to fabricate the macrocomposite body is illustrated schematically in FIG. 7.

Sample A

About 2000 grams of Grade A-17 alumina particulate (Alcoa Industrial Chemicals Division, Bauxite, Ark.) were placed into the approximately 10 liter mixing chamber of a V-blender (Porta Shell Lab Blender, Patterson Pump Co., a subsidiary of Banner Industries, Inc., Toccoa, Ga.). The cover was secured and the mixer was started. After mixing for about 5 minutes to break down the larger agglomerates against the high rotational speed intensifier bar, the mixing was stopped temporarily. About 100 grams of magnesium particulate (−325 mesh, Atlantic Equipment Engineers, Bergenfield, N.J.) having substantially all particles less than about 45 microns in diameter, were added to the mixing chamber and the admixture was blended for about 10 minutes. The mixer was stopped, the mixing chamber was opened, and about 20 grams of the particulate admixture was removed and stirred into an approximately 50 ml aluminum sample cup containing about 20 grams of ethyl alcohol to form a slurry of filler material 220. The remaining dry particulate admixture was stored in an approximately 4 liter NALGENE® plastic jar (Nalge Co., Rochester, N.Y.) for future use 220.

A matrix metal ingot 222 measuring about 2 inches (51 mm) square by about ½ inch (13 mm) thick and comprising by weight about 0.4 to 0.8 percent silicon, $\leq 0.7$ percent iron, about 0.15 to 0.40 percent copper, $\leq 0.15$ percent manganese, about 0.8 to 1.2 percent magnesium, about 0.04 to 0.35 percent chromium, $\leq 0.25$ percent zinc, $\leq 0.15$ percent titanium and the balance aluminum was sandblasted to remove any adhered surface oxide and then rinsed with ethyl alcohol to remove any adhered debris from the sandblasting operation. The matrix metal ingot 222 was then placed into a stainless steel pan measuring about 16 inches (406 mm) long by about 12 inches (305 mm) wide by about ½ inch (13 mm) deep and oriented such that one 2 inch (51 mm) by 2 inch (51 mm) face contacted the stainless steel. A shallow reservoir was created around one of the 2 inch (51 mm) square faces by applying a length of HIGHLAND® cellophane tape (Commercial Office Supply Division, 3M Corporation, St. Paul, Minn.) to the four 2 inch (51 mm) by ½ inch (13 mm) faces of the matrix metal ingot 222 such that the tape extended about ¼ inch (6 mm) over the edge of the ingot. The slurry of filler material 220 was then poured over the matrix metal ingot 222 into the formed reservoir and allowed to dry in air at ambient temperature for about 3 to 5 hours. The cellophane tape was removed from the coated matrix metal ingot 222.

Sample B

A dry particulate admixture comprising CERALOX HPA alumina (Ceralox Corp., Tucson, Ariz.) having an average particle size of about 0.3 micron and magnesium particulate (−325 mesh, Atlantic Equipment Engineers, Bergenfield, N.J.) having substantially all particles less than about 45 microns in size was prepared in substantially the same manner as the particulate admixture of Sample A. The particulate admixture 224 was then slurrified in substantially the same manner as that prepared for Sample A. An ingot of a matrix metal 226 of substantially the same size and composition as that used in Sample A was cleaned in a similar fashion as the Sample A ingot. A coating of filler material 224 was then formed on the matrix metal ingot 226 in substantially the same manner as that which was coated on the matrix metal ingot in Sample A.

A GRAFOIL® graphite foil box 228 (Union Carbide Company, Carbon Products Div., Cleveland, Ohio) was fabricated from a single sheet of GRAFOIL® measuring about 15 mils (0.38 mm) thick by making strategically placed cuts and folds into the sheet. The shape of the box was maintained by placing staples in the folds in the graphite foil. The GRAFOIL® box 228 measured about 11 inches (279 mm) long by about 8 inches (203 mm) wide by about 3 inches (76 mm) tall and was placed into a stainless steel boat 230 measuring about 12 inches (305 mm) long by about 9 inches (229 mm) wide by about 11 inches (279 mm) tall. A bedding material 232 comprising Grade A-17 alumina particulate (Alcoa Industrial Chemicals Division) was poured into the GRAFOIL® box 228 to a depth of about ½ inch (13 mm) and leveled. The two coated matrix metal ingots 220, 222, 224, 226 (Samples A and B) were placed into the GRAFOIL® box 228 on top of the alumina powder bedding material 232 and oriented such that both coatings faced down against the alumina powder bedding 232. Additional Grade A-17 alumina particulate bedding material 232 was poured into the GRAFOIL® box 228 around the coated matrix metal ingots 220, 222, 224, 226 to a level about ½ inch (13 mm) above the top of the coated ingots. About 30 ml each by bulk volume of Grade RMC-3 magnesium turnings 234 (Reade Manufacturing Company, Lakehurst, N.J.) and Grade TI-LOY 97 titanium sponge 236 (Chemalloy Corporation, Bryn Mawr, Pa.) were placed into the stainless steel can 230 outside of the GRAFOIL® box 228. The titanium sponge 236 and magnesium turnings 234 functioned as a getter to absorb oxygen and moisture. A copper foil sheet 238 measuring about 14 inches (356 mm) long by about 13 inches (330 mm) wide by about 6 mils (0.15 mm) thick was placed over the opening of the stainless steel can. The portions of the copper extending over the sides of the can were folded down against the sides of the can to form an isolated chamber. A hole for a nitrogen gas purge tube 240 was provided through one side of the can.

Figure 8A:
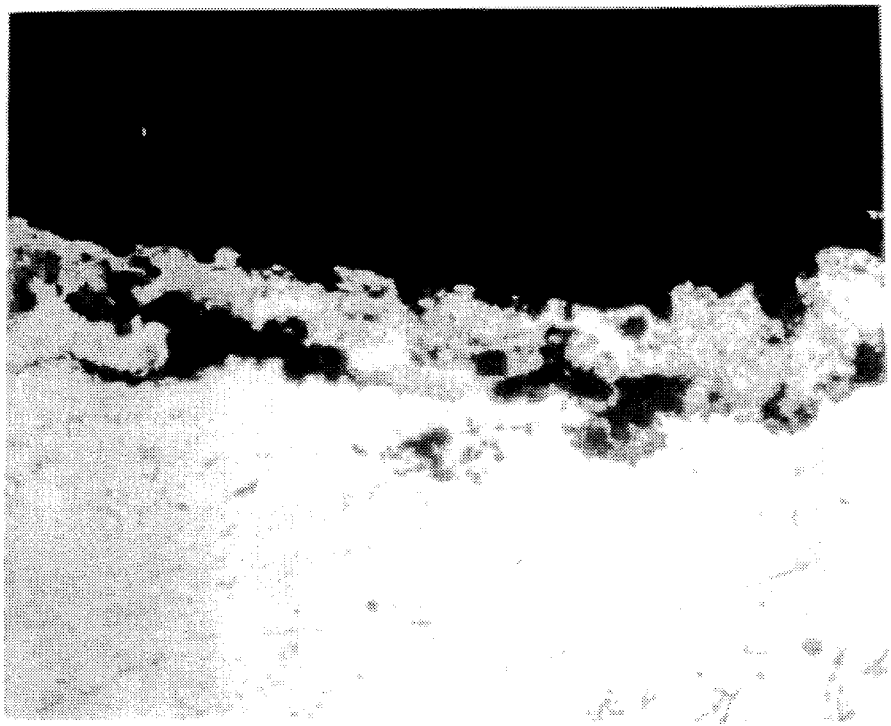
FIGS. 8A and 8B are optical photomicrographs taken at about 1000X magnification showing bodies formed in accordance with Example 2.
Figure 8B:
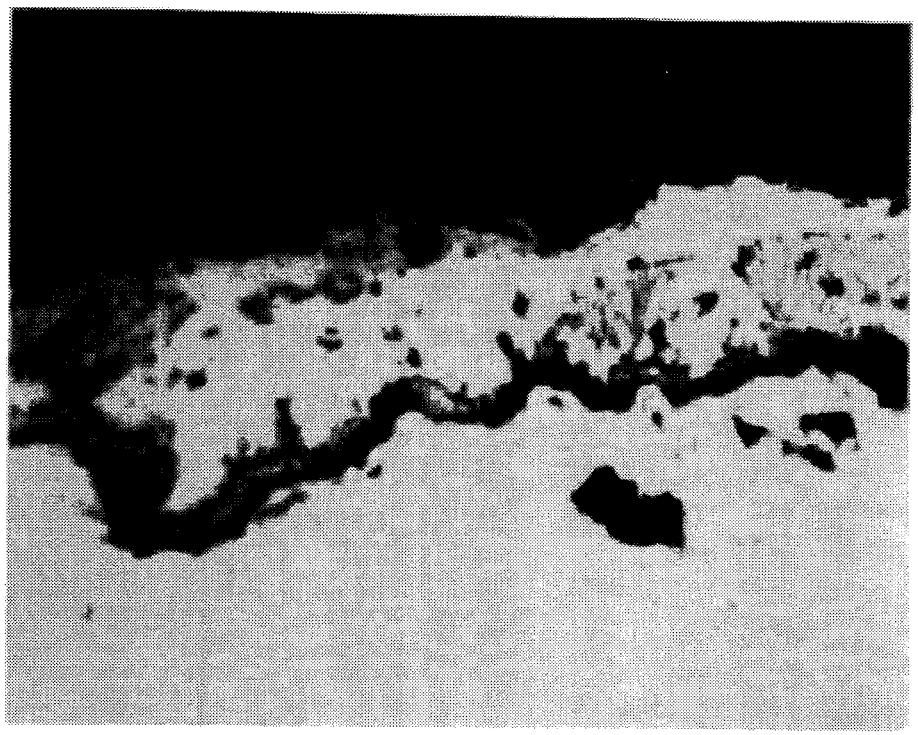

The stainless steel can 230 and its contents were placed into an electrical resistance heated, air atmosphere furnace. A gas flow rate of about 19 liters of commercially pure nitrogen per minute was established into the can through the purge tube 240. The furnace was heated from substantially room temperature to a temperature of about 200° C. in a period of about 15 minutes. As soon as a temperature of about 200° C. was achieved, the furnace temperature was increased to about 400° C. over a period of about 3 hours. The temperature was then increased from about 400° C. to about 475° C. over a period of about 7 hours. The temperature was then increased from about 475° C. to about 540° C. over a period of about 7 hours. The temperature was then increased from about 540° C. to about 725° C. over a period of about 3 hours. After maintaining a temperature of about 725° C. for about 2 hours, substantially all of the filler material 220, 224 had been infiltrated by matrix metal 222, 226, so the nitrogen gas purge tube 240 was disconnected and the stainless steel can 230 and its contents were removed from the furnace. The copper sheet 238 was removed from the top of the stainless steel can 230 and the contents were permitted to cool to about room temperature. Thereafter, the coated matrix metal ingots 220, 222, 224, 226 were removed from the alumina bedding material 232. A corner of each tile was removed with a diamond saw, mounted in a thermosetting polymer material and polished on a diamond wheel. The approximately 1000X magnification optical photomicrographs shown in FIGS. 8A and 8B demonstrate that the matrix metal 222, 226 did in fact infiltrate each coating of filler material 220, 224 to produce a thin metal matrix composite coating on the surface of the matrix metal substrate.

This Example demonstrates that a macrocomposite body comprising a matrix metal substrate having a metal matrix composite coating attached to at least one surface of the matrix metal substrate may be produced. The macrocomposite body is produced specifically by spontaneously infiltrating a permeable mass of filler material with a matrix metal present in an excess quantity beyond that required to completely infiltrate the permeable mass of filler.

EXAMPLE 3

Figure 9:
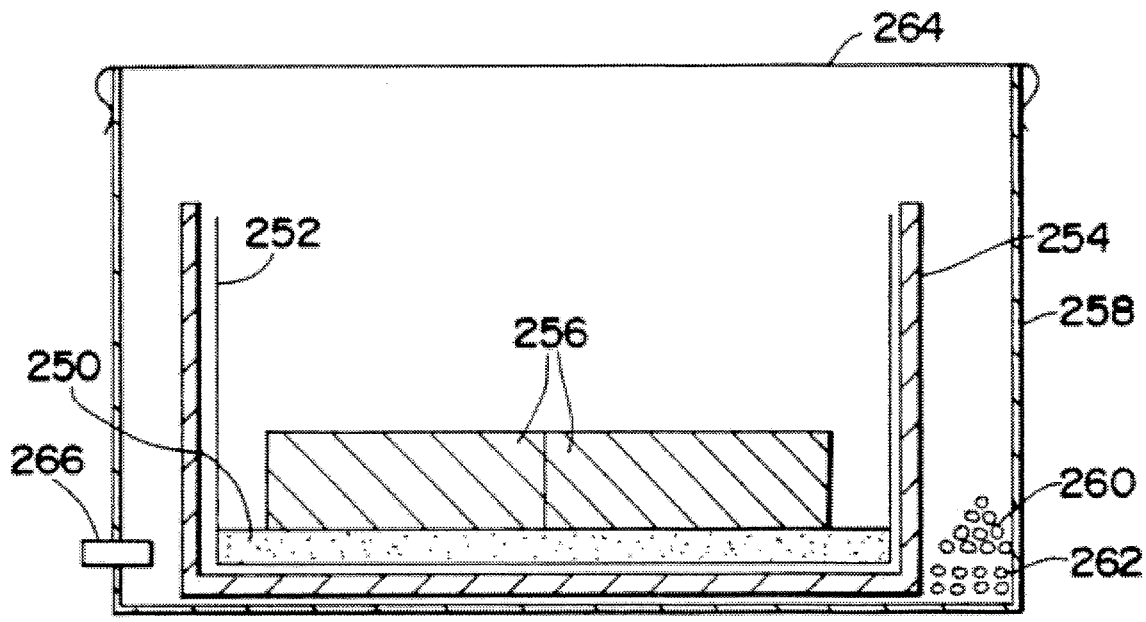
FIG. 9 is a schematic cross-sectional view of a lay-up used for forming a metal matrix composite body in accordance with Example 3.

This Example further demonstrates the concept of forming a macrocomposite body comprising a metal matrix composite layer on the surface of a matrix metal. In this embodiment, the matrix metal infiltrates a thin layer of loose filler material to form a metal matrix composite. The setup used to perform the infiltration is shown schematically in FIG. 9.

About 300 grams of Grade T-64 tabular alumina filler material 250 (−325 mesh, Alcoa Industrial Chemicals Division, Bauxite, Ark.) having substantially all particles less than about 45 microns in size was placed into a dry porcelain ball mill having approximately 4 liters of internal volume. About 150 grams of ball milling stones each having a diameter of about ¹⁵⁄₁₆ inch (24 mm) (Standard Ceramic Supply Company, a Division of Chem-Clay Corporation, Pittsburgh, Pa.) were placed into the mill and the lid to the mill was secured. After dry ball milling the tabular alumina filler material 250 for about 2 hours, about 150 grams of the milled tabular alumina filler material 250 was poured into a GRAFOIL® graphite foil box 252 (Union Carbide Co., Carbon Products Div., Cleveland, Ohio) measuring about 6 inches (152 mm) square and about 4 inches (102 mm) tall and leveled. The GRAFOIL® box 252 was fabricated from a single sheet of GRAFOIL® of about 15 mils (0.38 mm) thickness by making strategically placed cuts and folds in the GRAFOIL® sheet and stapling the folds to make a five-sided box open on one of the 6 inch (152 mm) by 6 inch (152 mm) faces. The GRAFOIL® box 252 was located inside of a graphite boat 254 having substantially the same interior dimensions as the GRAFOIL® box 252. Two matrix metal ingots 256 each measuring about 3 inches (76 mm) long by about 2 inches (51 mm) wide by about 1 inch (25 mm) thick and comprising by weight about 10.5 percent magnesium and the balance aluminum were sandblasted to remove any adhered surface oxide and then rinsed with ethyl alcohol to remove any debris from the sandblasting operation. The ingots were then placed into the GRAFOIL® box 252 on top of the tabular alumina filler material 250 such that one 3 inch (76 mm) by 2 inch (51 mm) face of each matrix metal ingot 256 contacted filler material 250 and one 3 inch (76 mm) by 1 inch (25 mm) face contacted the other ingot of matrix metal 256. The graphite boat 254 and its contents were then placed into a stainless steel can 258 measuring about 10 inches (254 mm) long by about 8 inches (203 mm) wide by about 10 inches (254 mm) deep. About 15 grams of Grade RMC-3 magnesium turnings 260 (Reade Manufacturing Company, Lakehurst, N.J.) and about 30 grams of TI-LOY 97 titanium sponge 262 (Chemalloy Corporation, Bryn Mawr, Pa.) were placed into the stainless steel can 258 outside of the graphite boat 254. The magnesium turnings 260 and the titanium sponge 262 served to getter any moisture or oxygen in the stainless steel can 258 during the run. A copper foil sheet 264 of commercial purity measuring about 12 inches (305 mm) by about 10 inches (254 mm) wide by about 6 mils (0.15 mm) thick was placed over the opening of the stainless steel can 258. The portions of the copper foil sheet 264 extending over the sides of the can 258 were folded down against the can 258 to form an isolated chamber. A hole for a nitrogen gas purge tube 266 was provided through one side of the can 258 near the base.

Figure 10:
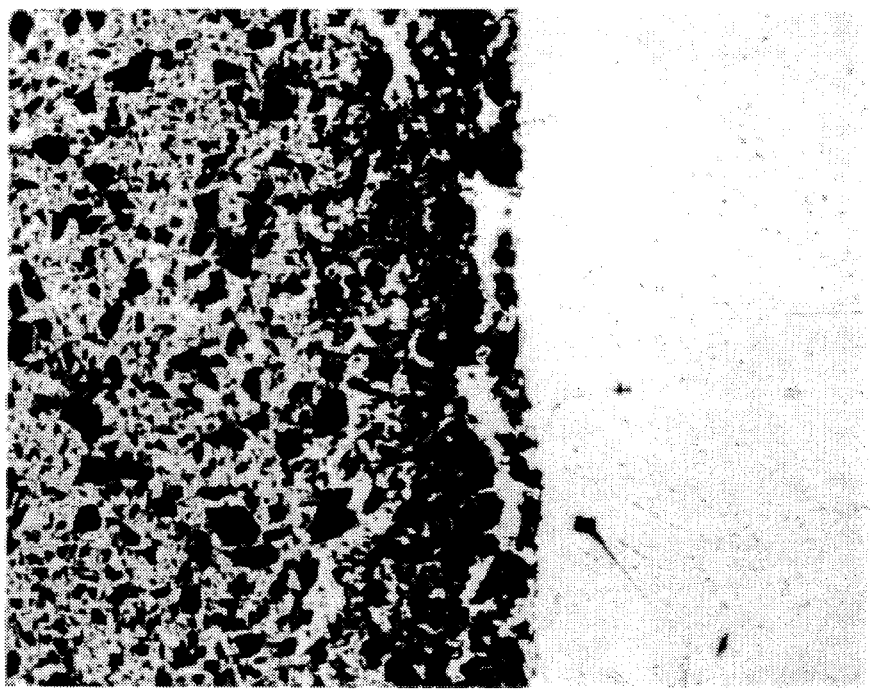
FIG. 10 is an optical photomicrograph taken at about 400X magnification showing a body formed according to Example 3.

The stainless steel can 258 and its contents were placed into a resistance heated, air atmosphere furnace. A gas flow rate into the can of about 15 liters per minute of commercially pure nitrogen was established through the purge tube 266. The furnace was then heated from substantially room temperature to a temperature of about 800° C. in about 4 hours. After maintaining a temperature of about 800° C. for about 4 hours, the nitrogen gas purge tube 266 was disconnected and the stainless steel can 258 and its contents were removed from the furnace. The copper foil sheet 264 was removed from the can 258 and the graphite boat 254 and its contents were also removed from the can 258 and set onto a refractory plate. A blanket of CARBORUNDUM® FIBERFRAX® ceramic fiber insulation measuring about 2 inches (51 mm) thick was placed over the top and around the sides of the graphite boat 254 to help directionally solidify the matrix metal 256. After cooling to substantially room temperature, the GRAFOIL® box 252 and its contents were removed from the graphite boat 254. The GRAFOIL® box 252 was then disassembled to reveal that the matrix metal 256 had infiltrated the thin layer of tabular alumina filler material 250 to produce a macrocomposite body comprising a thin metal matrix composite layer attached to the residual ingot of matrix metal. A vertical section of one of the corners of the solidified mass of metal matrix composite material and residual matrix metal 256 was made using a diamond saw. The vertical cross-section was then mounted in a thermosetting polymer material, polished on a diamond wheel, and examined using light microscopy. The approximately 400X magnification optical photomicrograph of FIG. 10 reveals that the thin metal matrix composite layer is metallurgically bonded to the residual matrix metal 256 remaining after the infiltration of the tabular alumina filler material 250. Thus, this Example further illustrates that a metal matrix composite layer can be formed on the surface of a matrix metal substrate with excellent attachment to the substrate by allowing a mass of matrix metal to infiltrate a thin layer of a filler material.

We claim:

1. A method for forming a macrocomposite body, comprising:

providing a permeable mass comprising a filler or a preform;

infiltrating at least a portion of the permeable mass with molten matrix metal to form a metal matrix composite body; and causing the formation of oxidation reaction product from at least a portion of at least one surface of the formed metal matrix composite body, said oxidation reaction product being chemically distinct from aluminum nitride.

2. The method of claim 1, wherein said matrix metal serves a dual role of both a matrix metal and a parent metal.

3. The method of claim 1, wherein said infiltrating comprises at least one of a pressure infiltration or a vacuum infiltration.

4. The method of claim 1, wherein said causing comprises placing said metal matrix composite body in an environment which causes the formation of oxidation reaction product from said matrix metal.

5. The method of claim 1, wherein as said oxidation reaction product is formed from matrix metal, additional matrix metal is supplied to at least a portion of the metal matrix composite body.

6. The method of claim 1, wherein said causing comprises at least one of: (1) providing a non-homogeneous composition in the permeable mass; (2) changing a temperature at which infiltration occurs to a temperature at which oxidation reaction product formation occurs; and (3) changing from an atmosphere in which infiltration occurs to an atmosphere in which formation of oxidation reaction product occurs.

7. The method of claim 1, wherein said oxidation reaction product grows into an atmosphere to form a ceramic surface on a metal matrix composite substrate.

8. The method of claim 1, wherein said oxidation product grows into a filler material juxtaposed to said metal matrix composite to form a ceramic matrix composite surface on a metal matrix composite substrate.

9. The method of claim 1, wherein at least one of an infiltration enhancer precursor and an infiltration enhancer is provided to at least one of said matrix metal and said permeable mass.

10. The method of claim 9, wherein an infiltrating atmosphere is in communication with said permeable mass during at least a portion of the infiltration.

11. The method of claim 6, wherein said non-homogeneous composition comprises a first area in the permeable mass which is capable of being infiltrated under the process conditions and a second area which is not capable of being infiltrated under the process conditions.

12. The method of claim 11, wherein said second area is capable of being grown into by oxidation reaction product.

13. The method of claim 11, wherein said first and second areas comprise an assemblage of preforms.

14. The method of claim 1, wherein said matrix metal comprises aluminum.

15. The method of claim 1, wherein said permeable mass comprises a ceramic.

16. The method of claim 1, wherein said oxidation reaction product comprises at least one material selected from the group consisting of oxides, carbides, borides, silicon nitride, titanium nitride and zirconium nitride.

17. The method of claim 6, wherein further said atmosphere in which infiltration occurs comprises an atmosphere selected from the group consisting of nitrogen and oxygen.

18. A method for forming a macrocomposite body, comprising:

providing a permeable mass comprising a filler or a preform;

infiltrating at least a portion of the permeable mass with a molten matrix metal comprising titanium to form a metal matrix composite body; and causing the formation of oxidation reaction product from at least a portion of at least one surface of the formed metal matrix composite body.

19. A method for forming a macrocomposite body, comprising:

providing a permeable mass comprising a filler or a preform;

infiltrating at least a portion of said permeable mass with molten matrix metal to form a metal matrix composite body;

juxtaposing a second permeable mass comprising a filler or a preform adjacent to said metal matrix composite body, said filler or preform being chemically distinct from aluminum nitride; and causing the formation and growth of oxidation reaction product from at least a portion of at least one surface of the formed metal matrix composite body into at least a portion of said second permeable mass.

* * * * *